Jan. 23, 1951    F. E. LINKE    2,539,091
SPRING MOUNTING FOR AUTOMOTIVE VEHICLES
Filed June 27, 1947
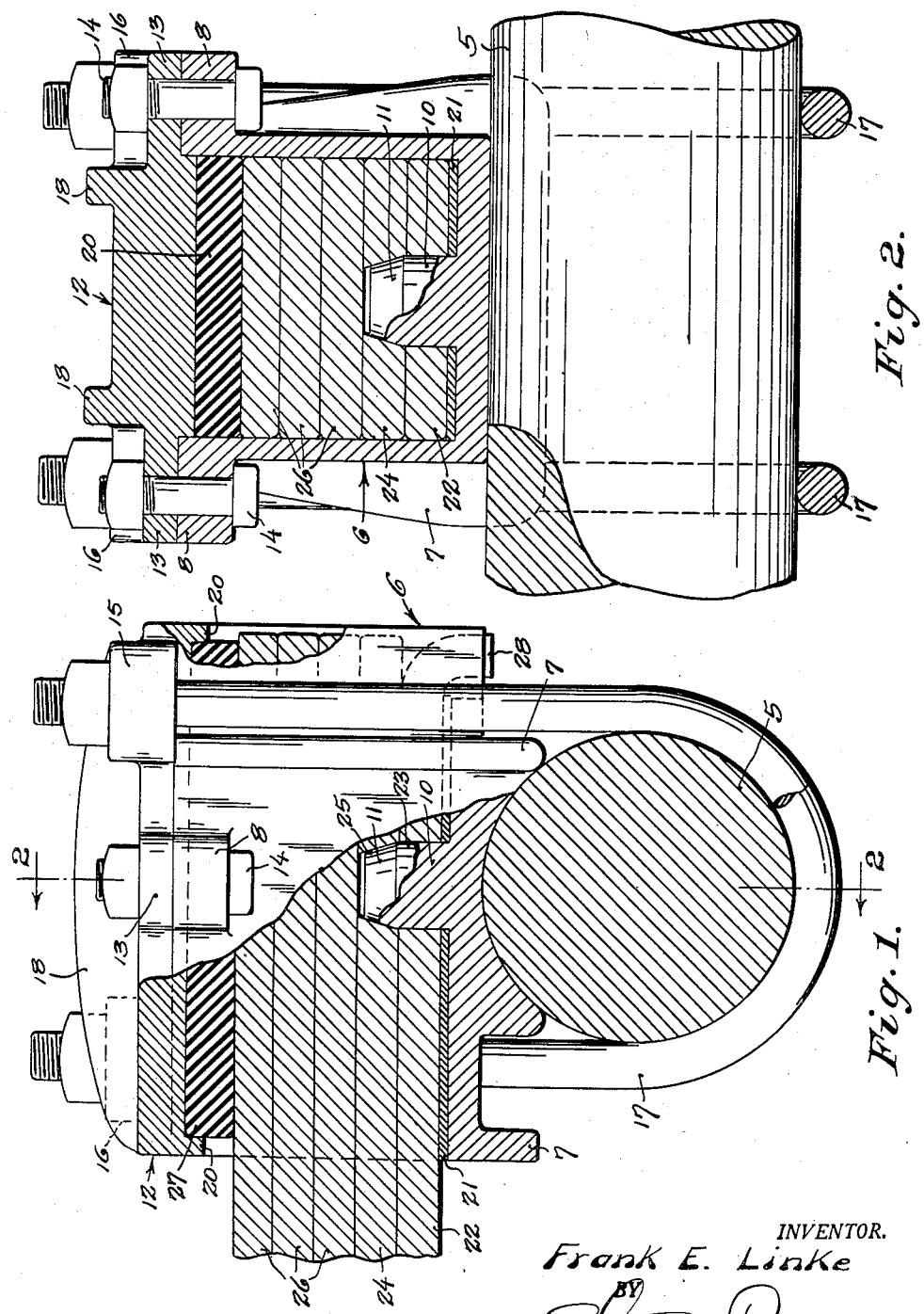
INVENTOR.
Frank E. Linke
BY
ATTORNEY.

Patented Jan. 23, 1951

2,539,091

UNITED STATES PATENT OFFICE 2,539,091

SPRING MOUNTING FOR AUTOMOTIVE VEHICLES

Frank E. Linke, Seattle, Wash.

Application June 27, 1947, Serial No. 757,360

12 Claims. (Cl. 267—54)

1

This invention relates to a spring mounting for automotive vehicles, and particularly a mounting for that type of spring which is comprised of a connected assembly of several leaves, superposed one upon another and which finds perhaps its greatest usage as applied to heavy-duty trucks and trailers. Trucks and trailers which rely for their suspension upon multiple-leaf springs of the type to which the present invention pertains are most usually of that nature in which dual rear axles are provided, and in which the ends of the spring assembly are anchored one end to one tandem axle and the other end to the other tandem axle and with the multiple leaves being shackled together at the center of the assembly and the shackle rigidly secured upon a trunnion shaft, the trunnion shaft finding a pivotal mounting in a suitable bearing made rigid with the vehicle frame. In stating that this is the most usual application of multiple-leaf springs, I have in mind the application of multiple-leaf spring assemblies to a single rear axle, and in which case one end of the assembly is anchored to the axle while the several leaves are shackled together at the other end and such shackle immovably anchored to the frame. The present invention particularly concerns itself with the anchor mounting for that end of the multiple-leaf spring which attaches to the axle, and lends itself equally well to either a single or a tandem rear-axle hook-up.

One difficulty experienced in the springing of the axles of a heavy-duty truck or trailer is the flexing movement imposed upon the spring ends by the torque stresses to which the axle is subjected both by the act of applying the brakes and, should the axle house a live axle, by surges of power, and it therefore becomes desirable that there be engineered into the spring mounting provision for a certain degree of rotary flexure between the axle and the spring ends to which it is attached. There has been heretofore devised a spring mounting which, to a degree, compensates the mounting to various torque stresses encountered in the operation of the vehicle, and the device to which I refer is that illustrated and described in U. S. Letters Patent No. 2,284,646 issued June 2, 1942, to Roy M. Eidal. This said mounting provides an axle-carried housing for the spring ends and applies within this housing cushioning pads of rubber. Such pads are applied both above and below the housed ends of the spring assembly, and the consequence thereof is that the patentee largely defeats his own purpose. The lower pad perforce takes the en-

2 tire dead weight of the load-packed spring ends and is hence compressed to a degree which substantially destroys its elasticity while at the same time relieving the upper pad of any appreciable compressive pressure. In the operation of the vehicle, the result is that the upper pad is inoperative to snub the torque stresses in the initial stage of their development and destructive pounding not infrequently occurs in the spring mountings.

The present invention overcomes the above objection while still retaining the advantages of a torque-snubbing arrangement by the simple expedient of retaining only a single cushioning pad above the spring ends and replacing the lower pad with a steel wear plate.

There has been this further objection to the device of the above-mentioned patent, and that is the weakness of the means therein employed to secure the spring ends against endwise movement in relation to the axle-carried housing. This weakness, while also inherent to various other spring mountings, becomes magnified in a mounting such as the device in question due to the fact that where the spring ends are permitted even the slightest movement within the housing, the securing means are subjected to unusually heavy strain. The patented device relies solely upon the more or less usual procedure of forming a downturned terminal upon the extreme end of the lowermost leaf of the spring assembly, and hooking this terminal within a slot provided in the base wall of the housing. Where reliance is placed solely upon this hooking terminal, and the latter be broken off by shearing strain, the result is to permit the axle-carried housing to run off the end of the spring assembly and by the resulting separation free the related end of the axle of its only connection with the frame. There have been a number of instances in which this separation has occurred, and while relatively more frequent in those vehicles which have embodied flexible spring-end mountings like or similar to that of the Eidal assembly, the referred-to run-off has also occurred with rigid-type mountings. The present invention has the further and important object of devising a spring-end mounting which to all practical purposes will obviate liability of the spring ends becoming separated from the axle.

Having the foregoing objects in mind, and with other objects and advantages in view which will become apparent in the course of the following description and claims and which look to the general end of perfecting an axle mounting for the end or ends of a multiple-leaf spring assembly, the invention consists in the novel construction and in the adaptation and combination of parts hereinafter described and claimed.

In the accompanying drawing:

Figure 1 is a fragmentary view partly in elevation and partly in longitudinal vertical section illustrating a spring-end mounting embodying the teachings of the present invention; and Fig. 2 is a fragmentary view principally in transverse vertical section but also having parts in elevation and with the section being taken on line 2—2 of Fig. 1.

Represented by the numeral 5 in said drawing is the rear axle of a truck or trailer, and which may be either a single rear axle or one of two tandem rear axles. Seating on said axle and formed upon its underside with a suitable saddle recess finding a close fit with the axle there is provided a housing 6, and this housing is secured in position by welding the same to the axle. The housing is or may be a casting externally reinforced by ribs 7 and has a U-shape when viewed from a direction longitudinal to the vehicle, presenting at the top and at a point central to the length a lug 8 projecting outwardly from each side. Piercing these lugs are bolt holes. A characteristic of this housing is its provision of an upstanding stud-button made integral with the bottom wall and located by preference in substantial centered relation to the latter both as respects its transverse and longitudinal dimensions. This stud-button, which is of substantial diameter, is cylindrical at the bottom and is of a truncated conical form at the top, with the height of its cylindrical portion, denoted 10, being slightly greater than the thickness of a single leaf of the spring assembly, hereinafter to be referred to, whereas the conical head 11 is preferably of a height slightly less than this thickness.

Arranged and adapted to rest upon and serve as a cap for the housing there is provided a plate 12 let into and finding a snug shouldering fit within the upper part of the chamber of the housing, and there is provided along each side of this cap a set of three outwardly directed lugs, one of which, denoted 13, overlies the lug 8 and has a bolt hole registering with the corresponding hole of the latter to accommodate a connecting bolt 14, and the other two of which, designated 15 and 16, are positioned at the ends and are apertured to act in complement as a means for strapping the cap to the axle through the instrumentality of U-bolts 17. As with the housing, the cap is reinforced by external ribs 18. At each end of the cap member there are provided downturned lips 20.

The spring assembly for which the present invention is designed is most usually built up from some twelve or more leaves, and as applied to tandem rear axles is suggestive of a pentagonal figure in that a severalty of leaves of generally identical length are applied as a group at the bottom of the pile while each of the remaining leaves are of progressively shorter lengths. Being concerned only with this lower group of leaves, and which I have indicated as being five in number, the drawing deletes any showing of the upper leaves or the trunnion-mounted shackle which binds the multiple leaves in a unitary assembly.

In anchoring the ends of the said bottom leaves to the housing, there is first applied upon the floor of the latter a steel plate 21 suitably apertured to enable the same to be slipped over the stud-button and, with the cap 12 being perforce removed, the spring ends are then introduced to the housing. The lowermost leaf, designated 22, provides a cylindrical opening 23 registering with the button and forming a close-fitting socket for the cylindrical part 10 of the latter. In the leaf 24 which lies immediately thereabove there is provided a second and registering aperture 25, and this aperture is the substantial mating counterpart of the conical head 11 to produce a socket for the latter. The remaining three leaves 26, superposed one above another upon the leaf 24, bring the overall height of the housed ends of the spring assembly into proximate spaced relation to the top of the housing's side walls, and there is then inserted to the housing in surmounting relation to the spring ends a pad 27 of rubber, Neoprene, or other suitable elastic material, and this pad, which has an expanded thickness bringing its upper level above the upper limit of the housing's side walls, is placed under moderate compression by drawing the cap 12 down upon the housing. The lips 20 of the cap overhang the ends of the elastic pad to confine the latter against possibility of endwise creeping.

From the foregoing it will be apparent that the single cushioning pad is substantially relieved of any compressive pressures originating in the dead load of the vehicle, and thus maintains a full degree of resiliency to allow for and compensate the spring mounting to torque stresses transmitted from the axle to the spring ends when the vehicle is in use. Rather than relying upon the usual instrumentality of hooking a downturned end of one of the housed spring ends in a slot of the housing to lock the spring assembly against becoming disengaged from the housing, my anchoring button, finding a socketing engagement within the two lower leaves of the spring assembly, is self-evidently a markedly superior lock with little if any liability of becoming sheared, there being, however, an additional safeguard in the fact that the end extremity of the botom leaf is bent downwardly as at 28 and lodges behind a re-entrant cut formed at the back end of the housing's bottom wall. In order that this hooking terminal will remain ordinarily free of any strain, the re-entrant opening is cut inwardly beyond the point occupied by the frontal face of the hook. It may be pointed out in respect of the advantages of the button lock that its permitted location central to the length of the housing reduces the degree to which the parts move vertically under flexing motion of the spring ends, and aside from reducing wear upon the button or its socket any liability of the parts hanging up is minimized to an extent whereby it becomes possible to produce the socket with very little tolerance, thus holding the spring ends against any endwise slippage. The possibility of a hang-up is obviated not alone by the lessened relative movement of the button in its socket but also by the provision of the conical head which makes the spring leaves self-centering.

It is thought that the invention will have been clearly understood from the foregoing description having express reference to the illustration of my now-preferred embodiment. Various changes in details of construction will be largely self-evident and may be resorted to without the exercise of invention and it is my intention that the hereto annexed claims be read with the broadest interpretation which their language fairly permits.

What I claim is:

1. A mounting for the end of a multiple-leaf spring assembly and comprising a U-shaped housing having an upstanding stud-button made integral with the floor of the housing, an assembly of superposed leaf springs received by an end in the U-chamber of the housing and providing a socket fitting over the stud-button, and a cap for the open top of the U-chamber confining the leaves within the housing, the housed end of the lowermost leaf in the pile providing a downturned terminal normally out of contact with the housing but arranged to hook the latter in the eventuality of the spring leaves slipping by a shearing of the stud-button.

2. A mounting for the end of a multiple-leaf spring assembly and comprising a metal mounting base having an upstanding stud-button made integral therewith and formed to provide a cylindrical base and a co-axial truncated conical head, an assembly of superposed leaf springs received by an end upon the base and providing a socket fitting the stud-button, means associated with the mounting base and with the latter producing a housing for the spring ends, and elastic cushioning means received in the housing and permitting vertical flexure of the housed spring ends within prescribed limits less than the depth of the socket.

3. A mounting for the end of a multiple-leaf spring assembly and comprising a mounting base having an upstanding stud-button made integral therewith, an assembly of superposed leaf springs received by an end upon the base and providing a socket fitting the stud-button, means associated with the mounting base and with the latter producing a housing for the spring ends, and elastic cushioning means received in the housing to permit limited vertical flexure of the housed spring ends, the permissible flexure being positively confined by the housing within limits less than the socketed length of the stud-button.

4. A mounting for the end of a multiple-leaf spring assembly and comprising a mounting base having an upstanding stud-button made rigid therewith, an assembly of superposed leaf springs received by an end upon the base and providing a socket fitting the stud button, an elastic cushioning pad surmounting said end of the spring assembly, and means associated with the mounting base and with the latter producing a housing confining said end of the spring assembly and the surmounting pad, the elastic pad occupying a space, vertical dimension considered, less than the socketed length of the stud-button.

5. The structure of claim 4 in which the stud-button is placed central to the length and width of the housing.

6. A mounting for the end of a multiple-leaf spring assembly and comprising a U-shaped housing having an upstanding stud-button made rigid with the floor of the housing and placed in approximate centered relation to the length and width of the latter, a plate seating over the floor of said housing and apertured to allow the stud-button to project through and above the same, an assembly of superposed leaf-springs received by an end in the U-chamber of the housing to seat upon the plate and providing a socket fitting over the stud-button, an elastic cushioning pad applied in surmounting relation to the housed spring ends, and a cap for the open top of the U-chamber confining the spring ends and the pad within the housing.

7. A mounting for the end of a multiple-leaf spring assembly and comprising a U-shaped housing, a non-compressible plate seating over the floor of said housing, an assembly of superposed leaf-springs received by an end in the U-chamber of the housing to seat directly upon the plate, an elastic cushioning pad applied in surmounting relation to the housed spring ends, and a cap for the open top of the U-chamber confining the spring ends and the pad within the housing, means being provided positively holding the housed spring ends against endwise movement while permitting the same to flex vertically within the limit prescribed by the compressibility of the elastic pad.

8. A mounting for the end of a multiple-leaf spring assembly and comprising a mounting base having an upstanding stud-button made integral therewith and formed to provide a cylindrical base and a co-axial truncated conical head, a spring assembly comprised of multiple leaves bound in a pile and having the ends of several said leaves received upon the mounting base and formed in the lowermost leaf with a socket fitting the cylindrical portion of the stud-button while providing a registering socket in the next lowest leaf fitting the conical head of the stud-button, an elastic cushioning pad surmounting the uppermost of said leaf ends, and means associated with the mounting base and with the latter confining said spring ends and the pad within a vertical compass allowing the spring ends to flex within a prescribed limit less than the socketed length of the stud-button.

9. In combination with a spring assembly composed of multiple leaves bound in a pile and in spaced proximity of one end having a severalty of the leaves less than the whole number pierced to present a socket open to the bottom of the pile and located normal to the plane of the spring leaves, a mounting for said socket-presenting end comprising a housing closely confining the latter and providing a stud fitting in the socket and positively held by the housing against movement in a direction endwise to the housing, the height of the stud being less than the depth of the socket.

10. A mounting for the end of a multiple-leaf spring assembly and comprising a mounting base having an upstanding stud-button made rigid therewith, an assembly of superposed leaf springs received by an end upon the base and providing a socket fitting the stud-button, an elastic cushioning pad surmounting said end of the spring assembly, and means associated with the mounting base and with the latter producing a housing closely confining said end of the spring assembly and the surmounting pad, the bottom support given by the base to the received end of the spring assembly being inflexible.

11. A mounting for the end of a multiple-leaf spring assembly and comprising a mounting base having an upstanding stud-button made rigid therewith, an assembly of superposed leaf springs received by an end upon the base and providing a socket fitting the stud-button, an elastic cushioning pad surmounting said end of the spring assembly, and means associated with the mounting base and with the latter producing a housing closely confining said end of the spring assembly and the surmounting pad, the housed end of the lowermost leaf in the pile providing a downturned terminal normally out of contact with the housing but arranged to hook the latter in the eventuality of the spring leaves slipping by a shearing of the stud-button.

12. A mounting for the end of a multiple-leaf spring assembly and comprising boltably interconnected base and cap members acting in complement to provide a chambered housing, a non-compressible plate seating over the floor of said housing, an assembly of superposed leaf-springs confined by an end in the chamber of the housing to seat directly upon the plate, and an elastic cushioning pad applied in surmounting relation to the housed spring ends, means being provided positively holding the housed spring ends against endwise movement while permitting the same to flex vertically within the limit prescribed by the compressibility of the elastic pad.

FRANK E. LINKE.

REFERENCES CITED

The following references are of record in the file of this patent:

UNITED STATES PATENTS

| Number | Name | Date |
|---|---|---|
| 1,018,250 | McIntyre | Feb. 20, 1912 |
| 1,176,395 | Moore | Mar. 21, 1916 |
| 1,748,747 | Alden et al. | Feb. 25, 1930 |
| 1,792,038 | Rossi | Feb. 10, 1931 |
| 1,822,131 | Davis | Sept. 8, 1931 |
| 1,892,163 | Sprong | Oct. 27, 1931 |
| 2,059,352 | Hoke | Nov. 3, 1936 |
| 2,284,646 | Eidal | June 2, 1942 |

FOREIGN PATENTS

| Number | Country | Date |
|---|---|---|
| 191,590 | Great Britain | Jan. 18, 1923 |